US011685429B2

(12) United States Patent
Yamaguchi et al.

(10) Patent No.: US 11,685,429 B2
(45) Date of Patent: Jun. 27, 2023

(54) STEERING CONTROL DEVICE

(71) Applicant: JTEKT CORPORATION, Osaka (JP)

(72) Inventors: Takafumi Yamaguchi, Kuwana (JP); Takahiro Toko, Takahama (JP); Nobuaki Kataoka, Okazaki (JP); Yukinobu Ezaki, Kasugai (JP)

(73) Assignee: JTEKT CORPORATION, Kariya (JP)

( * ) Notice: Subject to any disclaimer, the term of this patent is extended or adjusted under 35 U.S.C. 154(b) by 362 days.

(21) Appl. No.: 17/156,825

(22) Filed: Jan. 25, 2021

(65) Prior Publication Data
US 2021/0229737 A1 Jul. 29, 2021

(30) Foreign Application Priority Data

Jan. 27, 2020 (JP) .................. 2020-010559

(51) Int. Cl.
*B62D 5/04* (2006.01)
*B62D 15/02* (2006.01)

(52) U.S. Cl.
CPC ......... *B62D 5/0469* (2013.01); *B62D 5/0409* (2013.01); *B62D 5/0463* (2013.01); *B62D 15/0215* (2013.01)

(58) Field of Classification Search
None
See application file for complete search history.

(56) References Cited

U.S. PATENT DOCUMENTS

| | | | | |
|---|---|---|---|---|
| 2012/0330506 A1* | 12/2012 | Kleinhans | ............ | B62D 5/0469 701/36 |
| 2012/0330510 A1* | 12/2012 | Kawase | ............... | B62D 5/0469 701/41 |
| 2015/0239495 A1 | 8/2015 | Kameda | | |
| 2016/0221601 A1 | 8/2016 | Barthomeuf et al. | | |
| 2021/0070361 A1* | 3/2021 | Erickson | .................. | H02P 6/08 |

FOREIGN PATENT DOCUMENTS

| | | |
|---|---|---|
| DE | 102015102630 A1 | 8/2015 |
| JP | 2016-155519 A | 9/2016 |

OTHER PUBLICATIONS

Jun. 21, 2021 Search Report issued in European Patent Application No. 21153140.5.

* cited by examiner

*Primary Examiner* — Christian Chace
*Assistant Examiner* — Scott R Jagolinzer
(74) *Attorney, Agent, or Firm* — Oliff PLC

(57) ABSTRACT

A steering control device includes: an absolute steering angle detecting unit configured to detect an absolute steering angle; and a current command value calculating unit configured to calculate a current command value corresponding to a target value of the motor torque output from the motor. The current command value calculating unit is configured to perform partial release control for decreasing a correction value of the current command value due to execution of the end contact relaxation control when a vehicle is tried to be turned at the time of execution of the end contact relaxation control. The current command value calculating unit is configured to stop the partial release control when the current command value which is calculated at the time of execution of the partial release control is a value which is not affected by decreasing the correction value based on execution of the partial release control.

5 Claims, 6 Drawing Sheets

STEERING CONTROL DEVICE

CROSS-REFERENCE TO RELATED APPLICATION

This application claims priority to Japanese Patent Application No. 2020-010559 filed on Jan. 27, 2020, incorporated herein by reference in its entirety.

BACKGROUND

1. Technical Field

The disclosure relates to a steering control device.

2. Description of Related Art

In the related art, an electric power steering system (EPS) including an actuator with a motor as a drive source is known as a vehicular steering system. As such an EPS, there is an EPS that acquires a steering angle of a steering wheel as an absolute angle including a range exceeding 360° and performs various types of control based on the steering angle. As an example of such control, for example, Japanese Unexamined Patent Application Publication No. 2016-155519 (JP 2016-155519 A) discloses that end contact relaxation control for relaxing an impact of so-called end contact in which a rack end which is an end of a rack shaft comes into contact with a rack housing is performed.

In the EPS described in JP 2016-155519 A, a rack end position at which movement of the rack shaft is physically limited by an end contact is correlated with a steering angle and the steering angle at that position is stored as an end-position-corresponding angle. In the EPS, an impact of an end contact is relaxed by decreasing a target value of a motor torque which is output from a motor based on a distance of the steering angle from the end-position-corresponding angle.

SUMMARY

In the configuration according to the related art, movement of the rack shaft may be limited to a virtual rack end position which is closer to a neutral steering position than an actual rack end position at which the rack shaft actually comes into contact with the rack housing by performing end contact relaxation control. In this case, the steering angle is less than that when the rack shaft is located at the actual rack end position. That is, a minimum turning radius when movement of the rack shaft is limited to the virtual rack end position is greater than a minimum turning radius based on the structure of a vehicle. Accordingly, there is concern of deterioration in small-turn performance of a vehicle due to execution of end contact relaxation control when the vehicle is turning.

The disclosure provides a steering control device that can curb deterioration in small-turn performance of a vehicle.

According to an aspect of the disclosure, there is provided a steering control device for a steering system including a housing, a turning shaft that is accommodated in the housing such that the turning shaft is able to reciprocate, and an actuator that applies a motor torque for causing the turning shaft to reciprocate using a motor as a drive source. The steering control device includes: an absolute steering angle detecting unit configured to detect an absolute steering angle which is a rotation angle of a rotation shaft which is able to be converted into a turning angle of turning wheels connected to the turning shaft and which is expressed as an absolute angle including a range exceeding 360°; and a current command value calculating unit configured to calculate a current command value corresponding to a target value of the motor torque output from the motor. The steering control device is configured to control activation of the motor such that an actual current value which is supplied to the motor reaches the current command value. The current command value calculating unit is configured to store an end-position-corresponding angle which is an angle indicating an end position at which movement of the turning shaft is limited due to end contact in which the turning shaft comes into contact with the housing and which is correlated with the absolute steering angle. The current command value calculating unit is configured to perform end contact relaxation control for correcting the current command value such that a decrease of an end separation angle indicating a distance of the absolute steering angle from the end-position-corresponding angle is limited when the end separation angle is equal to or less than a predetermined angle. The current command value calculating unit is configured to perform partial release control for decreasing a correction value of the current command value due to execution of the end contact relaxation control when a vehicle is tried to be turned at the time of execution of the end contact relaxation control. The current command value calculating unit is configured to stop the partial release control when the current command value which is calculated at the time of execution of the partial release control is a value which is not affected by decreasing the correction value based on execution of the partial release control.

With this configuration, for example, even when movement of the turning shaft is limited at a virtual end position due to execution of end contact relaxation control, partial release control is performed to decrease the correction value of the current command value when a driver tries to turn a vehicle while traveling. Accordingly, it is possible to move the turning shaft to an actual end position. As a result, it is possible to curb deterioration in small-turn performance of the vehicle.

With this configuration, when the current command value calculated at the time of execution of the partial release control is a value which is not affected by decreasing the correction value based on execution of the partial release control, the partial release control is stopped. That is, in a steering situation in which the partial release control does not actually function, the partial release control is stopped. Accordingly, it is possible to curb sudden change of the current command value with stopping of the partial release control and to curb deterioration in a steering feeling.

In the steering control device, the current command value calculating unit may be configured to calculate the current command value such that an increase of the end separation angle is not limited through the end contact relaxation control when the end separation angle is equal to or less than the predetermined angle.

With this configuration, when the end separation angle is equal to or less than the predetermined angle, the current command value is calculated such that an increase of the end separation angle is not limited by execution of the end contact relaxation control. Accordingly, the motor torque is less likely to be insufficient, for example, when return steering from the vicinity of an end position is performed. As a result, a catching feeling is less likely to be caused and it is possible to curb deterioration in a steering feeling.

In the steering control device, the current command value calculating unit may be configured to calculate a steering angle limit value which decreases with a decrease of the end separation angle when the end separation angle is equal to or less than the predetermined angle. The current command value calculating unit may be configured to perform the end contact relaxation control by limiting an absolute value of the current command value to the steering angle limit value. The current command value calculating unit may be configured to perform the partial release control by increasing the steering angle limit value. The current command value calculating unit may be configured to stop the partial release control based on a result of comparison between the current command value which is calculated at the time of execution of the partial release control and a stop determination value based on the steering angle limit value which is not increased due to execution of the partial release control.

With this configuration, the current command value calculated at the time of execution of the partial release control is compared with the stop determination value based on the steering angle limit value which is not increased by execution of the partial release control. Accordingly, it is possible to appropriately determine whether the current command value calculated at the time of execution of the partial release control is a value which is not affected by decreasing the correction value based on execution of the partial release control.

In the steering control device, when a sign of the current command value for causing the motor to generate the motor torque for turning the turning wheels in one of rightward and leftward directions is defined as being positive and the sign of the current command value for causing the motor to generate the motor torque for turning the turning wheels in the other direction is defined as being negative, the current command value calculating unit may be configured to stop the partial release control when the end separation angle is equal to or less than the predetermined angle by turning the turning wheels in one direction and the current command value calculated at the time of execution of the partial release control is less than the stop determination value which is positive, and to stop the partial release control when the end separation angle is equal to or less than the predetermined angle by turning the turning wheels in the other direction and the current command value calculated at the time of execution of the partial release control is greater than the stop determination value which is negative.

With this configuration, for example, even when the sign of the current command value is inverted by return steering, it is possible to appropriately determine whether the current command value calculated at the time of execution of the partial release control is a value which is not affected by decreasing the correction value based on execution of the partial release control.

In the steering control device, the current command value calculating unit may be configured to calculate an angle limiting component which decreases as the end separation angle increases. The current command value calculating unit may be configured to calculate the steering angle limit value based on a value obtained by subtracting the angle limiting component from a rated current of the motor. The current command value calculating unit may be configured to calculate the angle limiting component such that the angle limiting component is less at the time of execution of the partial release control than at the time of non-execution of the partial release control.

With this configuration, since the end contact relaxation control is performed such that the current command value is limited to the steering angle limit value, the correction value of the current command value through execution of the end contact relaxation control decreases as the steering angle limit value increases. Since the steering angle limit value is calculated based on a value obtained by subtracting the angle limiting component from the rated current, the steering angle limit value increases as the angle limiting component decreases. Accordingly, it is possible to easily perform the partial release control for decreasing the correction value of the current command value by decreasing the angle limiting component.

According to the disclosure, it is possible to curb deterioration in small-turn performance of a vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
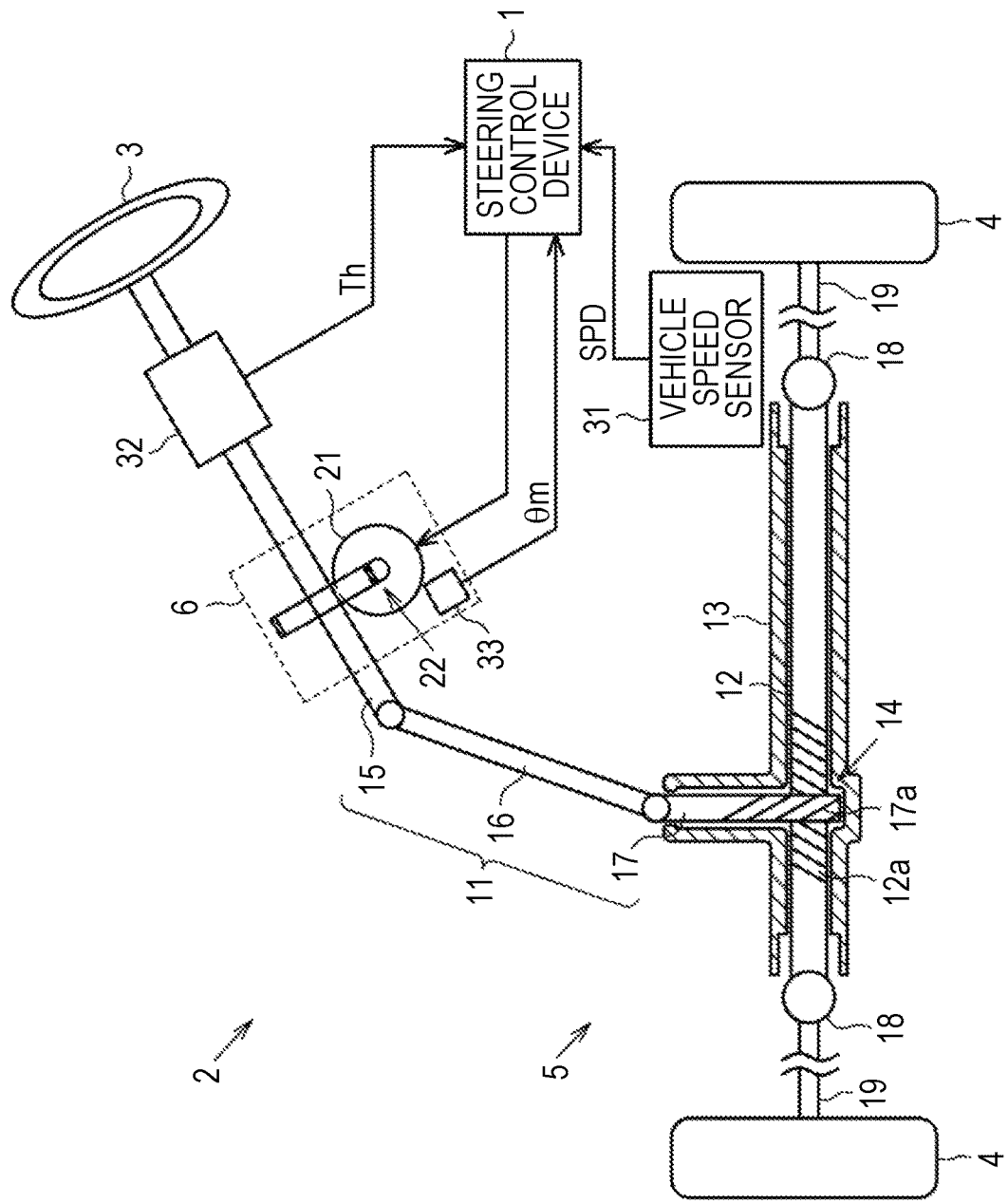
FIG. 1 is a diagram schematically illustrating a configuration of an electric power steering system.

Hereinafter, a steering control device according to a first embodiment of the disclosure will be described with reference to the accompanying drawings. As illustrated in FIG. 1, an electric power steering device (EPS) 2 which is a steering device to be controlled by a steering control device 1 includes a steering mechanism 5 that turns turning wheels 4 based on a driver's operation of a steering wheel 3. The EPS 2 further includes an EPS actuator 6 which is an actuator that applies an assist force for assisting with a steering operation to the steering mechanism 5.

The steering mechanism 5 includes a steering shaft 11 to which the steering wheel 3 is fixed, a rack shaft 12 which is a turning shaft connected to the steering shaft 11, a rack housing 13 which is a housing into which the rack shaft 12 is inserted such that it can reciprocate, and a rack and pinion mechanism 14 that converts a rotational motion of the steering shaft 11 to a translational motion of the rack shaft 12 in the axial direction. The steering shaft 11 has a configuration in which a column shaft 15, an intermediate shaft 16, and a pinion shaft 17 are connected sequentially from the side on which the steering wheel 3 is located.

The rack shaft 12 and the pinion shaft 17 are arranged with a predetermined crossing angle in the rack housing 13. The rack and pinion mechanism 14 has a configuration in which rack teeth 12a formed on the rack shaft 12 and pinion teeth 17a formed on the pinion shaft 17 engage with each other. Tie rods 19 are connected to both ends of the rack shaft 12 via rack ends 18 of which each is formed of a ball joint provided at each shaft end in a drivable manner. The tips of the tie rods 19 are connected to knuckles (not illustrated) to which the turning wheels 4 are assembled. Accordingly, in the EPS 2, a rotational motion of the steering shaft 11 based on a steering operation is converted to a translational motion in an axial direction of the rack shaft 12 by the rack and pinion mechanism 14 and the translational motion in the axial direction is transmitted to the knuckles via the tie rods 19, whereby a turning angle of the turning wheels 4, that is, a travel direction of a vehicle, is changed.

A position of the rack shaft 12 at which the rack end 18 comes into contact with the left end of the rack housing 13 is a position at which the steering wheel 3 can be maximally steered to the right side, and this position corresponds to a rack end position which is a right end position. A position of the rack shaft 12 at which the rack end 18 comes into contact with the right end of the rack housing 13 is a position at which the steering wheel 3 can be maximally steered to the left side, and this position corresponds to a rack end position which is a left end position.

The EPS actuator 6 includes a motor 21 which is a drive source and a reduction gear mechanism 22 such as a worm and wheel. The motor 21 is connected to the column shaft 15 via the reduction gear mechanism 22. The EPS actuator 6 applies a motor torque as an assist force to the steering mechanism 5 by reducing rotation of the motor 21 using the reduction gear mechanism 22 and transmitting the reduced rotation to the column shaft 15. A three-phase brushless motor is employed as the motor 21 according to this embodiment.

The steering control device 1 is connected to the motor 21 and controls operation thereof. The steering control device 1 includes a central processing unit (CPU) and a memory which are not illustrated and the CPU executes a program stored in the memory every predetermined calculation cycle. Accordingly, various types of control are performed.

A vehicle speed sensor 31 that detects a vehicle speed SPD of the vehicle and a torque sensor 32 that detects a steering torque Th which is applied to the steering shaft 11 according to a driver's steering are connected to the steering control device 1. A rotation sensor 33 that detects a rotation angle $\theta m$ of the motor 21 as a relative angle in a range of 360° is connected to the steering control device 1. For example, the steering torque Th and the rotation angle $\theta m$ are detected as positive values when the steering wheel 3 is steered to the right side and are detected as negative values when the steering wheel 3 is steered to the left side. The steering control device 1 controls the operation of the EPS actuator 6, that is, an assist force which is applied to the steering mechanism 5 such that the rack shaft 12 can move to reciprocate, by supplying drive power to the motor 21 based on signals indicating state quantities which are input from the sensors.

Figure 2:
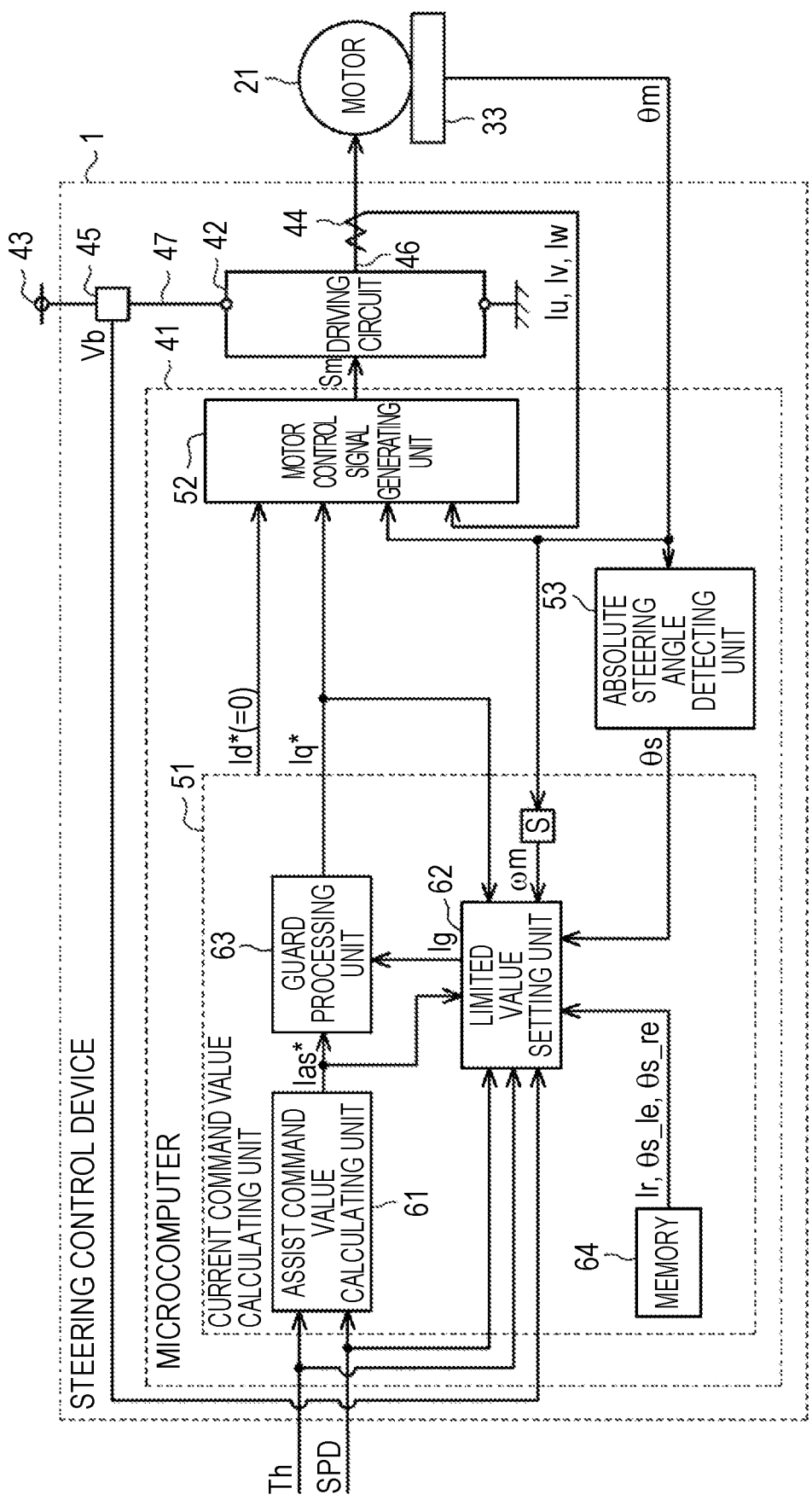
FIG. 2 is a block diagram illustrating a steering control device.

The configuration of the steering control device 1 will be described below. As illustrated in FIG. 2, the steering control device 1 includes a microcomputer 41 that outputs a motor control signal Sm and a drive circuit 42 that supplies drive power to the motor 21 based on the motor control signal Sm. A known PWM inverter including a plurality of switching elements such as FETs is employed as the drive circuit 42 according to this embodiment. The motor control signal Sm which is output from the microcomputer 41 defines ON and OFF states of the switching elements. Accordingly, the switching elements are turned on and off in response to the motor control signal Sm and a power supply pattern to a motor coil of each phase is switched in phases, whereby DC power of an onboard power supply 43 is converted into three-phase drive power and is output to the motor 21.

Control blocks which will be described below are realized by a computer program which is executed by the microcomputer 41, state quantities are detected every predetermined sampling cycle, and calculation processes assigned to the following control blocks are performed every predetermined calculation cycle.

The vehicle speed SPD, the steering torque Th, and the rotation angle $\theta m$ of the motor 21 are input to the microcomputer 41. Phase current values Iu, Iv, and Iw of the motor 21 which are detected by a current sensor 44 and a source voltage Vb of the onboard power supply 43 which is detected by a voltage sensor 45 are also input to the microcomputer 41. The current sensor 44 is provided in a connection line 46 between the drive circuit 42 and the motor coil of each phase. The voltage sensor 45 is provided in a connection line 47 between the onboard power supply 43 and the drive circuit 42. In FIG. 2, for the purpose of convenience of description, one group of each of the current sensors 44 of the phases and each of the connection lines 46 of the phases is illustrated. The microcomputer 41 outputs a motor control signal Sm based on the input state quantities.

Specifically, the microcomputer 41 includes a current command value calculating unit 51 that calculates current command values Id* and Iq*, a motor control signal generating unit 52 that outputs a motor control signal Sm based on the current command values Id* and Iq*, and an absolute steering angle detecting unit 53 that detects an absolute steering angle $\theta s$.

A vehicle speed SPD, a steering torque Th, a source voltage Vb, a rotation angle $\theta m$, and an absolute steering angle $\theta s$ are input to the current command value calculating unit 51. The current command value calculating unit 51 calculates the current command values Id* and Iq* based on the input state quantities. The current command values Id* and Iq* are target values of currents to be supplied to the motor 21 and are a current command value on a d axis and a current command value on a q axis, respectively, in a d/q coordinate system. Among these, the q-axis current command value Iq* represents a target value of a motor torque which is output from the motor 21. In this embodiment, the d-axis current command value Id* is basically fixed to zero. For example, the current command values Id* and Iq* have positive values when steering to the right side is assisted with and have negative values when steering to the left side is assisted with.

The current command values Id* and Iq*, the phase current values Iu, Iv, and Iw, and the rotation angle m of the motor 21 are input to the motor control signal generating unit 52. The motor control signal generating unit 52 generates the motor control signal Sm by performing current feedback control in the d/q coordinate system based on the input state quantities.

Specifically, the motor control signal generating unit 52 calculates a d-axis current value Id and a q-axis current value Iq which are actual current values of the motor 21 in the d/q coordinate system by mapping the phase current values Iu, Iv, and Iw onto the d/q coordinate system based on the rotation angle $\theta m$. Then, the motor control signal generating unit 52 generates the motor control signal Sm by performing current feedback control such that the d-axis current value Id follows the d-axis current command value Id* and the q-axis current value Iq follows the q-axis current command value Iq*.

The motor control signal generating unit 52 outputs the generated motor control signal Sm to the drive circuit 42. Accordingly, drive power based on the motor control signal Sm is supplied to the motor 21 and a motor torque based on the q-axis current command value Iq* is output from the motor 21, whereby an assist force is applied to the steering mechanism 5.

The rotation angle θm is input to the absolute steering angle detecting unit 53. The absolute steering angle detecting unit 53 detects an absolute motor angle which is expressed as an absolute angle including a range exceeding 360° based on the rotation angle θm. The absolute steering angle detecting unit 53 in this embodiment integrates a rotation speed of the motor 21, for example, with an origin at the rotation angle θm when a start switch such as an ignition switch is turned on for the first time after the onboard power supply 43 has been replaced, and detects an absolute motor angle based on the integrated rotation speed and the rotation angle θm. Then, the absolute steering angle detecting unit 53 detects an absolute steering angle θs indicating a steering angle of the steering shaft 11 by multiplying the absolute motor angle by a conversion factor based on a reduction gear ratio of the reduction gear mechanism 22. In the steering control device 1 according to this embodiment, rotation of the motor 21 is monitored even when the start switch is turned off, and the rotation speed of the motor 21 is integrated normally. Accordingly, even when the start switch is turned on a second time or later after the onboard power supply 43 has been replaced, the origin of the absolute steering angle θs is the same as the origin which was set when the start switch was turned on for the first time.

Since the turning angle of the turning wheels 4 is changed by the rotational motion of the steering shaft 11 as described above, the absolute steering angle θs indicates a rotation angle of a rotation shaft which can be converted to the turning angle of the turning wheels 4. The absolute motor angle and the absolute steering angle θs have positive values when they are angles turned to the right side from the origin and have negative values when they are angles turned to the left side from the origin.

The configuration of the current command value calculating unit 51 will be described below. The current command value calculating unit 51 includes an assist command value calculating unit 61 that calculates an assist command value Ias* which is a base component of the q-axis current command value Iq*. The current command value calculating unit 51 further includes a limit value setting unit 62 that sets a limit value Ig which is an upper limit of the absolute value of the q-axis current command value Iq* and a guard processing unit 63 that limits the absolute value of the assist command value Ias* to a value equal to or less than the limit value Ig. A memory 64 is connected to the limit value setting unit 62.

The steering torque Th and the vehicle speed SPD are input to the assist command value calculating unit 61. The assist command value calculating unit 61 calculates the assist command value Ias* based on the steering torque Th and the vehicle speed SPD. Specifically, the assist command value calculating unit 61 calculates the assist command value Ias* to have a larger absolute value as the absolute value of the steering torque Th becomes greater and as the vehicle speed SPD becomes lower. The calculated assist command value Ias* is output to the limit value setting unit 62 and the guard processing unit 63.

The limit value Ig set by the limit value setting unit 62 in addition to the assist command value Ias* is input to the guard processing unit 63 as will be described later. When the absolute value of the input assist command value Ias* is equal to or less than the limit value Ig, the guard processing unit 63 outputs the value of the assist command value Ias* to the motor control signal generating unit 52 and the limit value setting unit 62 as the q-axis current command value Iq* without any change. On the other hand, when the absolute value of the input assist command value Ias* is greater than the limit value Ig, the guard processing unit 63 outputs a value obtained by limiting the absolute value of the assist command value Ias* to the limit value Ig to the motor control signal generating unit 52 and the limit value setting unit 62 as the q-axis current command value Iq*.

The rated current Ir which is a maximum current corresponding to a torque set in advance as a motor torque which can be output from the motor 21, end-position-corresponding angles θs_re and θs_le, and the like are stored in the memory 64. The end-position-corresponding angle θs_le on the left side is the absolute steering angle s corresponding to the left rack end position, and the end-position-corresponding angle θs_re on the right side is the absolute steering angle θs corresponding to the right rack end position. The end-position-corresponding angles θs_re and θs_le are set, for example, by appropriate learning which is performed based on a driver's steering.

The configuration of the limit value setting unit 62 will be described below. A motor angular velocity ωm which is obtained by differentiating the rotation angle θm, the absolute steering angle θs, the vehicle speed SPD, the steering torque Th, the source voltage Vb, the assist command value Ias*, the q-axis current command value Iq*, the rated current Ir, and the end-position-corresponding angles θs_re and θs_le are input to the limit value setting unit 62. The limit value setting unit 62 sets the limit value Ig based on the input state quantities.

Figure 3:
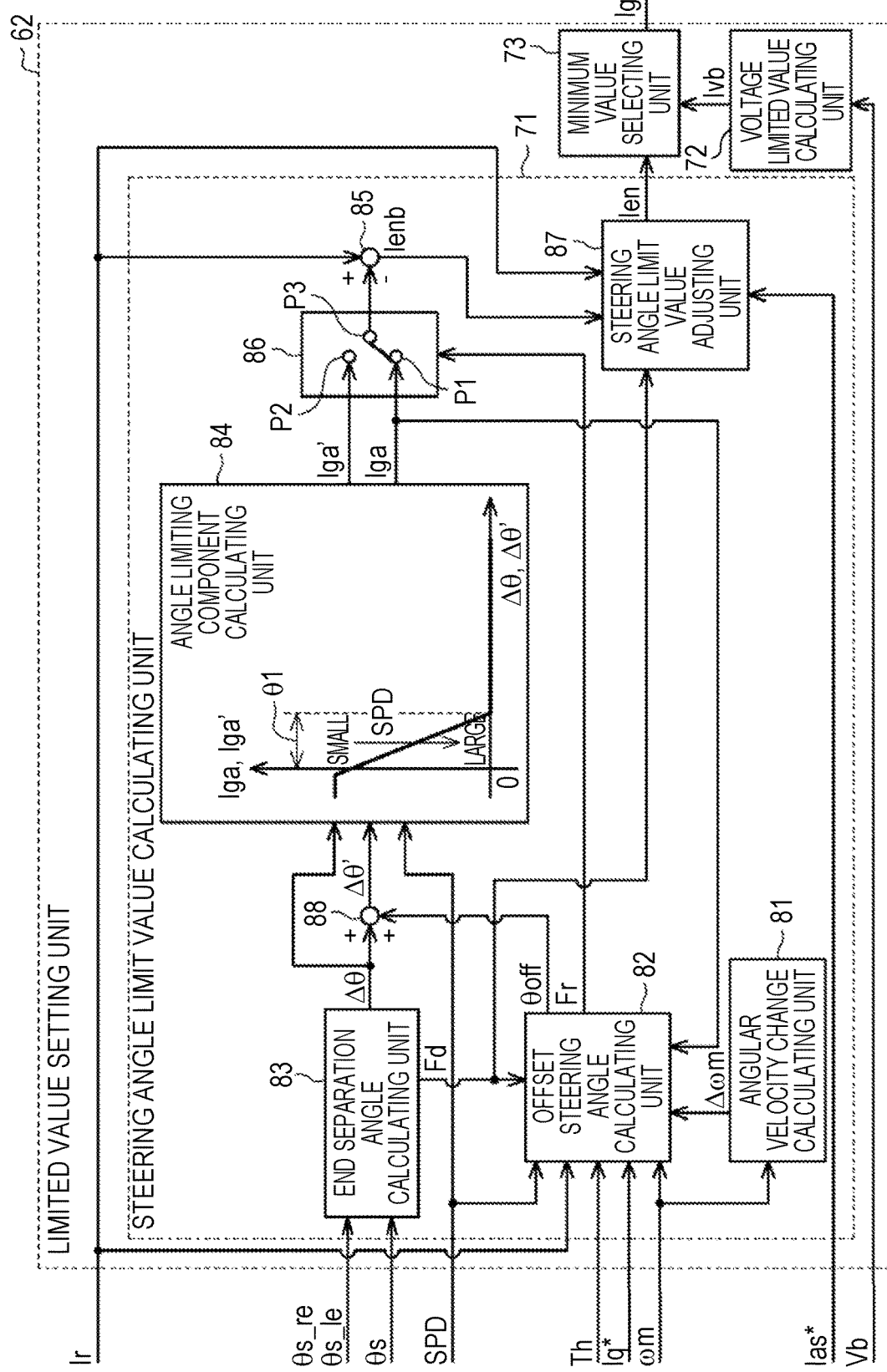
FIG. 3 is a block diagram illustrating a limit value setting unit.

Specifically, as illustrated in FIG. 3, the limit value setting unit 62 includes a steering angle limit value calculating unit 71 that calculates a steering angle limit value Ien based on the absolute steering angle θs, a voltage limit value calculating unit 72 that calculates a voltage limit value Ivb which is another limit value based on the source voltage Vb, and a minimum value selecting unit 73 that selects the smaller of the steering angle limit value Ien and the voltage limit value Ivb.

The motor angular velocity ωm, the absolute steering angle θs, the vehicle speed SPD, the steering torque Th, the assist command value Ias*, the q-axis current command value Iq*, the rated current Ir, and the end-position-corresponding angles θs_re and θs_le are input to the steering angle limit value calculating unit 71. The steering angle limit value calculating unit 71 calculates the steering angle limit value Ien which decreases with a decrease of an end separation angle Δθ indicating a distance of the absolute steering angle θs from the end-position-corresponding angles θs_re and θs_le based on the input state quantities when the end separation angle Δθ is equal to or less than a predetermined angle θ1 as will be described later. The calculated steering angle limit value Ien is output to the minimum value selecting unit 73.

The source voltage Vb is input to the voltage limit value calculating unit 72. The voltage limit value calculating unit 72 calculates the voltage limit value Ivb which is less than a rated voltage for supplying the rated current Ir when the absolute value of the source voltage Vb is equal to or less than a preset voltage threshold value Vth. Specifically, when the absolute value of the source voltage Vb is equal to or less than the voltage threshold value Vth, the voltage limit value calculating unit 72 calculates the voltage limit value Ivb having an absolute value which decreases with a decrease of the absolute value of the source voltage Vb. The calculated voltage limit value Ivb is output to the minimum value selecting unit 73.

The minimum value selecting unit 73 selects the smaller of the input steering angle limit value Ien and the input voltage limit value Ivb as the limit value Ig and outputs the selected one to the guard processing unit 63. When the steering angle limit value Ien is output as the limit value Ig to the guard processing unit 63, the absolute value of the q-axis current command value Iq* is limited to the steering angle limit value Ien. Accordingly, end contact relaxation control for relaxing an impact of an end contact is performed by decreasing the absolute value of the q-axis current command value Iq* with the decrease of the end separation angle $\Delta\theta$ when the end separation angle $\Delta\theta$ is equal to or less than the predetermined angle $\theta 1$. The current command value calculating unit 51 in this embodiment corrects the q-axis current command value Iq* such that the absolute value of the q-axis current command value Iq* is limited to equal to or less than the limit value Ig. The correction value of the q-axis current command value Iq* is an excess of the assist command value Ias* with respect to the limit value Ig, that is, an excess with respect to the steering angle limit value Ien.

When the voltage limit value Ivb is output as the limit value Ig to the guard processing unit 63, the absolute value of the q-axis current command value Iq* is limited to the voltage limit value Ivb. Accordingly, when the absolute value of the source voltage Vb is equal to or less than the voltage threshold value Vth, power supply protection control for decreasing the absolute value of the q-axis current command value Iq* with the decrease of the absolute value of the source voltage Vb is performed.

In execution of end contact relaxation control, movement of the rack shaft 12 may be limited at a virtual rack end position which is closer to the neutral steering position than an actual rack end position at which the rack shaft 12 actually comes into contact with the rack housing 13. In this case, the absolute steering angle $\theta s$ may be less than that when the rack shaft 12 is located at the actual rack end position, and small-turn performance of the vehicle may deteriorate.

Therefore, the current command value calculating unit 51 in this embodiment performs partial release control for decreasing the correction value of the q-axis current command value Iq* in execution of end contact relaxation control based on the steering torque Th input to the EPS 2 when a driver tries to turn the vehicle at the time of execution of end contact relaxation control. Since the guard processing unit 63 limits the absolute value of the q-axis current command value Iq* to equal to or less than the limit value Ig as described above, the correction value of the q-axis current command value Iq* decreases as the steering angle limit value Ien which is the limit value Ig increases. In consideration of this point, as will be described below, when a driver tries to turn the vehicle at the time of execution of end contact relaxation control, the steering angle limit value calculating unit 71 calculates the steering angle limit value Ien which is greater than that at the time of non-execution of partial release control and thus partial release control is performed in this embodiment.

Specifically, the steering angle limit value calculating unit 71 includes an angular velocity change calculating unit 81 that calculates an angular velocity change $\Delta\omega m$, an offset steering angle calculating unit 82 that calculates an offset steering angle $\theta$off, and an end separation angle calculating unit 83 that calculates the end separation angle $\Delta\theta$. The steering angle limit value calculating unit 71 includes an angle limiting component calculating unit 84 that calculates a normal angle limiting component Iga based on the end separation angle $\Delta\theta$ and a release angle limiting component Iga' based on a release end separation angle $\Delta\theta'$ which is obtained by adding the offset steering angle $\theta$off to the end separation angle $\Delta\theta$. The steering angle limit value calculating unit 71 further includes an output switching unit 86 that selects one of the angle limiting components Iga and Iga' and outputs the selected one to a subtractor 85, and calculates a pre-adjustment steering angle limit value Ienb by subtracting one of the angle limiting components Iga and Iga' from the rated current Ir. The steering angle limit value calculating unit 71 includes a steering angle limit value adjusting unit 87 that calculates a steering angle limit value Ien based on the pre-adjustment steering angle limit value Ienb. The control blocks will be sequentially described below.

Angular Velocity Change Calculating Unit 81

A motor angular velocity $\omega m$ is input to the angular velocity change calculating unit 81. The angular velocity change calculating unit 81 calculates an angular velocity change $\Delta\omega m$ which is an amount of change of the motor angular velocity $\omega m$ based on the input motor angular velocity $\omega m$. Then, the angular velocity change calculating unit 81 outputs the angular velocity change $\Delta\omega m$ to the offset steering angle calculating unit 82. The angular velocity change calculating unit 81 in this embodiment outputs a value obtained by performing a low-pass filtering process on the angular velocity change $\Delta\omega m$ to the offset steering angle calculating unit 82.

Offset Steering Angle Calculating Unit 82

The vehicle speed SPD, the steering torque Th, the motor angular velocity om, the angular velocity change $\Delta\omega m$, the q-axis current command value Iq*, the rated current Ir, the normal angle limiting component Iga, and a steering angle position flag Fd which will be described later are input to the offset steering angle calculating unit 82. The offset steering angle calculating unit 82 determines whether a driver tries to turn the vehicle while traveling by performing turning steering or holding steering at the time of execution of end contact relaxation control based on the input state quantities. When it is determined that the driver tries to turn the vehicle at the time of execution of end contact relaxation control, the offset steering angle calculating unit 82 starts calculation of the offset steering angle $\theta$off and outputs the calculated offset steering angle $\theta$off to an adder 88. When it is determined that the driver does not try to turn the vehicle at the time of execution of end contact relaxation control, the offset steering angle calculating unit 82 does not calculate the offset steering angle $\theta$off.

The offset steering angle calculating unit 82 outputs an execution flag Fr indicating whether partial release control is being performed to the output switching unit 86. The execution flag Fr indicates that partial release control is not being performed when the value thereof is "0," and indicates that partial release control is being performed when the value thereof is "1." The offset steering angle calculating unit 82 sets the value of the execution flag Fr to "0" before calculation of the offset steering angle $\theta$off is started, and sets the value of the execution flag Fr to "1" after calculation of the offset steering angle $\theta$off has been started. That is, the offset steering angle calculating unit 82 calculates the offset steering angle $\theta$off at the time of execution of partial release control, and does not calculate the offset steering angle $\theta$off at the time of non-execution of partial release control.

The offset steering angle calculating unit 82 calculates the offset steering angle off based on the steering torque Th using a model formula indicated by Expression (1).

$$|Th| = J \times \ddot{\theta}s^* + C \times \dot{\theta}s^* + K \times \theta s^* \qquad (1)$$

In the following description, for the purpose of convenience of description, a sign of a target steering velocity which is a first temporal differential value of "θs*" is referred to as "ωs*." This model formula defines and represents a relationship between the steering torque Th which is input via the steering wheel 3 and a rotation angle of a rotation shaft which can be converted into a turning angle of the turning wheels 4. This model formula is expressed using an elasticity coefficient K which is obtained by modeling specifications such as suspension or wheel alignment of the vehicle in which the EPS 2 is mounted, a viscosity coefficient C which is obtained by modeling friction or the like of the EPS 2, and an inertia coefficient J which is obtained by modeling inertia of the EPS 2.

The offset steering angle calculating unit 82 in this embodiment calculates a target steering velocity ωs* using Expression (2) in which the elasticity coefficient K and the inertia coefficient J are set to zero and the target steering velocity ωs* is defined in consideration of a decrease in calculation load and a steering feeling which is to be realized.

$$\dot{\theta}s* = \frac{|Th|}{C} \quad (2)$$

Then, the offset steering angle calculating unit 82 sets a value obtained by integrating the target steering velocity ωs* as the offset steering angle θoff. The offset steering angle θoff which is calculated in this way is output to the adder 88. Determination of intention of turning in the offset steering angle calculating unit 82, that is, execution and stop of partial release control, will be described later.

End Separation Angle Calculating Unit 83

The absolute steering angle θs and the end-position-corresponding angles θs_re and θs_le are input to the end separation angle calculating unit 83. The end separation angle calculating unit 83 calculates a left end separation angle Δθl which is a difference between the absolute steering angle θs and the end-position-corresponding angle θs_le on the left side in the newest calculation cycle and a right end separation angle Δθr which is a difference between the absolute steering angle θs and the end-position-corresponding angle θs_re on the right side in the newest calculation cycle. Then, the end separation angle calculating unit 83 outputs the smaller absolute value of the right end separation angle Δθr and the left end separation angle Δθl as the end separation angle Δθ to the angle limiting component calculating unit 84 and an adder 88.

The end separation angle calculating unit 83 sets the value of the steering angle position flag Fd indicating a position to which the steering wheel 3 is steered by comparing the absolute values of the right end separation angle Δθr and the left end separation angle Δθl with a preset end separation angle threshold value Δθth. The steering angle position flag Fd is output to the offset steering angle calculating unit 82 and the steering angle limit value adjusting unit 87. The end separation angle threshold value Δθth is a threshold value for determining to which side (to one of the right and left sides) the steering wheel 3 is steered and is set to a great value of about several hundreds of degrees.

Specifically, the end separation angle calculating unit 83 sets the value of the steering angle position flag Fd to "1" which indicates that the steering wheel 3 is steered in the positive direction, that is, that the turning wheels 4 are turned in the positive direction, when the absolute value of the right end separation angle Δθr is less than the end separation angle threshold value Δθth. The end separation angle calculating unit 83 sets the value of the steering angle position flag Fd to "2" which indicates that the steering wheel 3 is steered in the negative direction, that is, that the turning wheels 4 are turned in the negative direction, when the absolute value of the left end separation angle Δθl is less than the end separation angle threshold value Δθth. The end separation angle calculating unit 83 sets the value of the steering angle position flag Fd to "0" which indicates that the steering wheel 3 is located in the vicinity of the neutral position when the right end separation angle Δθr is equal to or greater than the end separation angle threshold value Δθth and the left end separation angle Δθl is equal to or greater than the end separation angle threshold value Δθth.

Angle Limiting Component Calculating Unit 84

The end separation angle Δθ and the vehicle speed SPD are input to the angle limiting component calculating unit 84. A release end separation angle Δθ' which is obtained by adding the offset steering angle θoff to the end separation angle Δθ in the adder 88 is input to the angle limiting component calculating unit 84. The release end separation angle Δθ' has a value which is greater by the value of the offset steering angle off than the end separation angle Δθ. The angle limiting component calculating unit 84 calculates the angle limiting components Iga and Iga' based on the input state quantities.

Specifically, the angle limiting component calculating unit 84 includes a normal map in which a relationship between the end separation angle Δθ and the vehicle speed SPD and the normal angle limiting component Iga is defined, and calculates the angle limiting component Iga corresponding to the end separation angle Δθ and the vehicle speed SPD with reference to the map. The calculated normal angle limiting component Iga is output to the offset steering angle calculating unit 82 and the output switching unit 86.

In this normal map, the angle limiting component Iga is set to decrease as the end separation angle Δθ increases from a zero state and to be zero when the end separation angle Δθ is greater than a predetermined angle θ1. In this normal map, an area in which the end separation angle Δθ is negative is also set, and the angle limiting component Iga increases in proportion to a decrease of the end separation angle Δθ when the end separation angle Δθ becomes less than zero and is kept constant after the end separation angle Δθ becomes the rated current Ir. The negative area in the map is assumed to be a degree by which the motor 21 rotates with elastic deformation of the EPS 2 by performing more turning steering in a state in which the rack end 18 is in contact with the rack housing 13. The predetermined angle θ1 is set to a small angle indicating a range close to the end-position-corresponding angles θs_re and θs_le. That is, the angle limiting component Iga is set to decrease when the absolute steering angle θs transitions from the end-position-corresponding angles θs_re and θs_le to the neutral steering position and to be zero when the absolute steering angle θs is located closer to the neutral steering position than to the vicinities of the end-position-corresponding angles θs_re and θs_le.

In this normal map, the angle limiting component Iga is set to decrease with an increase of the vehicle speed SPD in an area in which the end separation angle Δθ is equal to or less than the predetermined angle θ1. Specifically, the angle limiting component Iga is set to be greater than zero when the vehicle speed SPD is in a low-speed area, and the angle limiting component Iga is set to be zero when the vehicle speed SPD is in a middle-speed or high-speed area.

The angle limiting component calculating unit 84 includes a release map in which a relationship between the release end separation angle Δθ' and the vehicle speed SPD and the release angle limiting component Iga' is defined, and calculates the angle limiting component Iga' corresponding to the release end separation angle Δθ' and the vehicle speed SPD with reference to the map. The calculated release angle limiting component Iga' is output to the output switching unit 86.

The release map is set to be the same map as the normal map. That is, when the vehicle speed SPD is the same and the end separation angle Δθ and the end separation angle Δθ' are the same, the angle limiting component Iga and the angle limiting component Iga' which are calculated as a result are the same. Since the release end separation angle Δθ' has a value which is greater by the offset steering angle θoff than the end separation angle Δθ as described above, the angle limiting component calculating unit 84 calculates the release angle limiting component Ig' which is less by the offset steering angle θoff than the normal angle limiting component Ig.

Output Switching Unit 86

The angle limiting components Iga and Iga' and the execution flag Fr are input to the output switching unit 86. The output switching unit 86 includes a contact point P1 to which the normal angle limiting component Iga is input, a contact point P2 to which the release angle limiting component Iga' is input, and a contact point P3 which is connected to a subtractor 85. When the execution flag Fr is "0," the output switching unit 86 connects the contact point P1 and the contact point P3 and outputs the normal angle limiting component Iga to the subtractor 85. On the other hand, when the execution flag Fr is "1," the output switching unit 86 connects the contact point P2 and the contact point P3 and outputs the release angle limiting component Iga' to the subtractor 85.

Then, a value which is obtained by subtracting the normal angle limiting component Iga or the release angle limiting component Iga' from the rated current Ir in the subtractor 85 depending on whether partial release control is being performed is output as the pre-adjustment steering angle limit value Ienb to the steering angle limit value adjusting unit 87.

Steering Angle Limit Value Adjusting Unit 87

The configuration of the steering angle limit value adjusting unit 87 will be described below. In addition to the pre-adjustment steering angle limit value Ienb, the rated current Ir, the assist command value Ias*, and the steering angle position flag Fd are input to the steering angle limit value adjusting unit 87. The steering angle limit value adjusting unit 87 compares the assist command value Ias* with the pre-adjustment steering angle limit value Ienb with a positive sign (hereinafter referred to as a positive pre-adjustment steering angle limit value Ienb) when steering to right, that is, steering in the positive direction, is performed. When the assist command value Ias* is less than the positive pre-adjustment steering angle limit value Ienb, the steering angle limit value adjusting unit 87 sets the absolute value of the steering angle limit value Ien to the rated current Ir. On the other hand, when the assist command value Ias* is equal to or greater than the positive pre-adjustment steering angle limit value Ienb, the steering angle limit value adjusting unit 87 sets the absolute value of the steering angle limit value Ien to the pre-adjustment steering angle limit value Ienb.

The steering angle limit value adjusting unit 87 compares the assist command value Ias* with the pre-adjustment steering angle limit value Ienb with a negative sign (hereinafter referred to as a negative pre-adjustment steering angle limit value Ienb) when steering to left, that is, steering in the negative direction, is performed. When the assist command value Ias* is equal to or less than the negative pre-adjustment steering angle limit value Ienb, the steering angle limit value adjusting unit 87 sets the absolute value of the steering angle limit value Ien to the pre-adjustment steering angle limit value Ienb. On the other hand, when the assist command value Ias* is greater than the negative pre-adjustment steering angle limit value Ienb, the steering angle limit value adjusting unit 87 sets the absolute value of the steering angle limit value Ien to the rated current Ir.

It can be determined that turning steering in which the end separation angle Δθ decreases is performed when the assist command value Ias* is a positive value at the time of steering in the positive direction, and return steering in which the end separation angle Δθ increases is performed when the assist command value Ias* is a negative value. Accordingly, one of turning steering and return steering is performed when the assist command value Ias* is less than the positive pre-adjustment steering angle limit value Ienb, and turning steering is performed when the assist command value Ias* is equal to or greater than the positive pre-adjustment steering angle limit value Ienb. In other words, when return steering is performed at the time of steering in the positive direction, the assist command value Ias* is less than the positive pre-adjustment steering angle limit value Ienb.

Similarly, it can be determined that turning steering in which the end separation angle Δθ decreases is performed when the assist command value Ias* is a negative value at the time of steering in the negative direction, and turning steering in which the end separation angle Δθ increases is performed when the assist command value Ias* is a positive value. Accordingly, turning steering is performed when the assist command value Ias* is equal to or less than the negative pre-adjustment steering angle limit value Ienb, and one of turning steering and return steering is performed when the assist command value Ias* is greater than the negative pre-adjustment steering angle limit value Ienb. In other words, when return steering is performed at the time of steering in the negative direction, the assist command value Ias* is greater than the negative pre-adjustment steering angle limit value Ienb.

That is, the steering angle limit value adjusting unit 87 in this embodiment sets the absolute value of the steering angle limit value Ien to the rated current Jr when at least return steering is performed. Accordingly, when power supply protection control is not performed and the steering angle limit value Ien is set as the limit value Ig, the assist command value Ias* is output as the q-axis current command value Iq* without any change and correction of the q-axis current command value Iq* by end contact relaxation control is not performed even when the end separation angle Δθ is equal to or less than a predetermined angle θ1. When power supply protection control is performed and the voltage limit value Ivb is set as the limit value Ig, the q-axis current command value Iq* is limited even when the end separation angle Δθ is equal to or less than the predetermined angle θ1 and return steering is performed.

Figure 4:
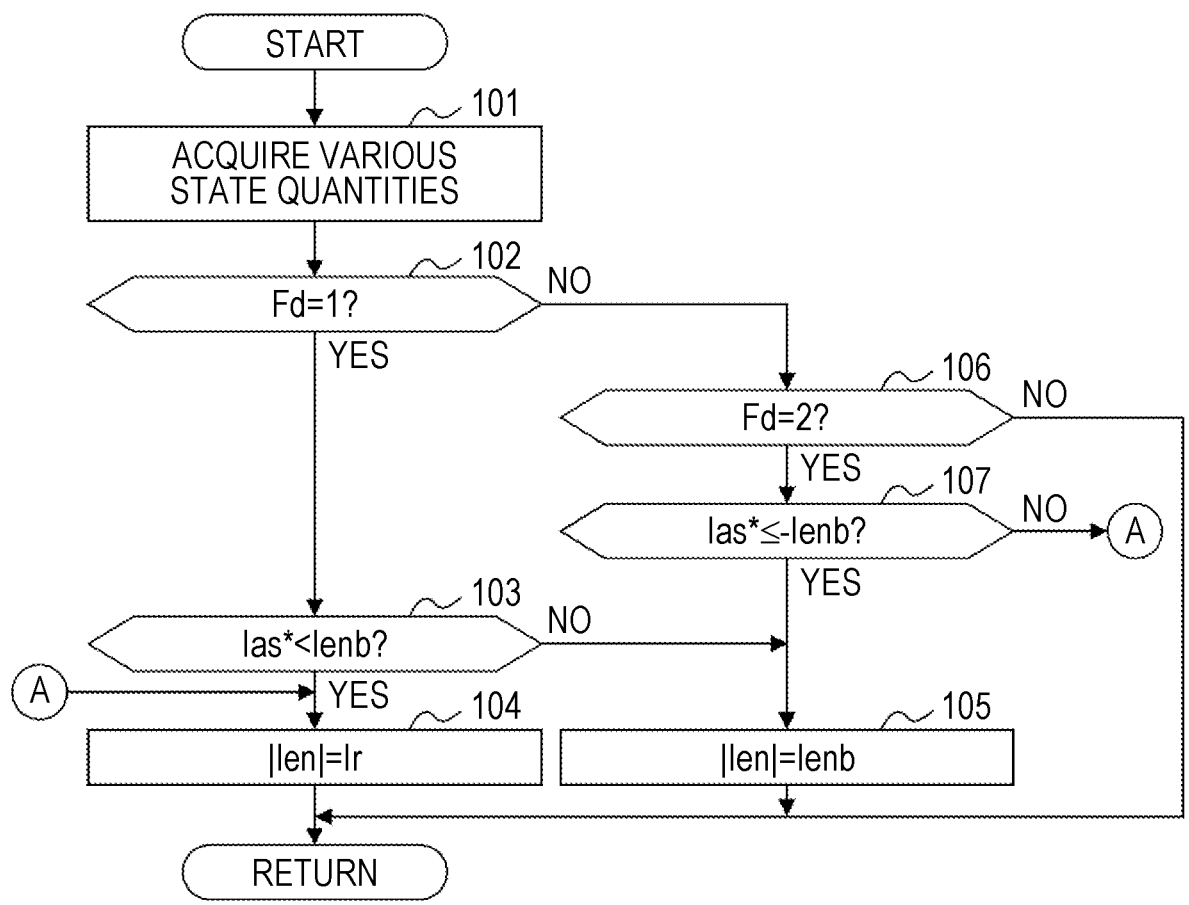
FIG. 4 is a flowchart illustrating a process routine of adjusting a steering angle limit value which is performed by a steering angle limit value adjusting unit.

Specifically, as illustrated in the flowchart of FIG. 4, when various types of state quantities are acquired (Step 101), the steering angle limit value adjusting unit 87 determines whether the steering angle position flag Fd is "1," that is, whether steering to right is performed (Step 102). When the steering angle position flag Fd is "1" (Step 102: YES), the steering angle limit value adjusting unit 87 determines whether the assist command value Ias* is less than the positive pre-adjustment steering angle limit value Ienb (Step 103). When the assist command value Ias* is less than the positive pre-adjustment steering angle limit value Ienb (Step 103: YES), the steering angle limit value adjusting unit 87 sets the absolute value of the steering angle limit value Ien to the rated current Ir (Step 104). On the other hand, when the assist command value Ias* is equal to or greater than the positive pre-adjustment steering angle limit value Ienb (Step 103: NO), the steering angle limit value adjusting unit 87 sets the absolute value of the steering angle limit value Ien to the pre-adjustment steering angle limit value Ienb (Step 105).

When the steering angle position flag Fd is not "1" (Step 102: NO), the steering angle limit value adjusting unit 87 determines whether the steering angle position flag Fd is "2," that is, whether steering to left is performed (Step 106). When the steering angle position flag Fd is "2" (Step 106: YES), the steering angle limit value adjusting unit 87 determines whether the assist command value Ias* is equal to or less than the negative pre-adjustment steering angle limit value Ienb (Step 107). When the assist command value Ias* is equal to or less than the negative pre-adjustment steering angle limit value Ienb (Step 107: YES), the steering angle limit value adjusting unit 87 causes the process routine to progress to Step 105 and sets the absolute value of the steering angle limit value Ien to the pre-adjustment steering angle limit value Ienb. On the other hand, when the assist command value Ias* is greater than the negative pre-adjustment steering angle limit value Ienb (Step 107: NO), the steering angle limit value adjusting unit 87 causes the process routine to progress to Step 104 and sets the absolute value of the steering angle limit value Ien to the rated current Ir.

When it is determined in Step 106 that the steering angle position flag Fd is not "2," that is, when the steering angle position flag Fd is "0" and the steering wheel 3 is located in the vicinity of the neutral position (Step 106: NO), the steering angle limit value adjusting unit 87 does not perform the processes subsequent thereto.

Figure 5:
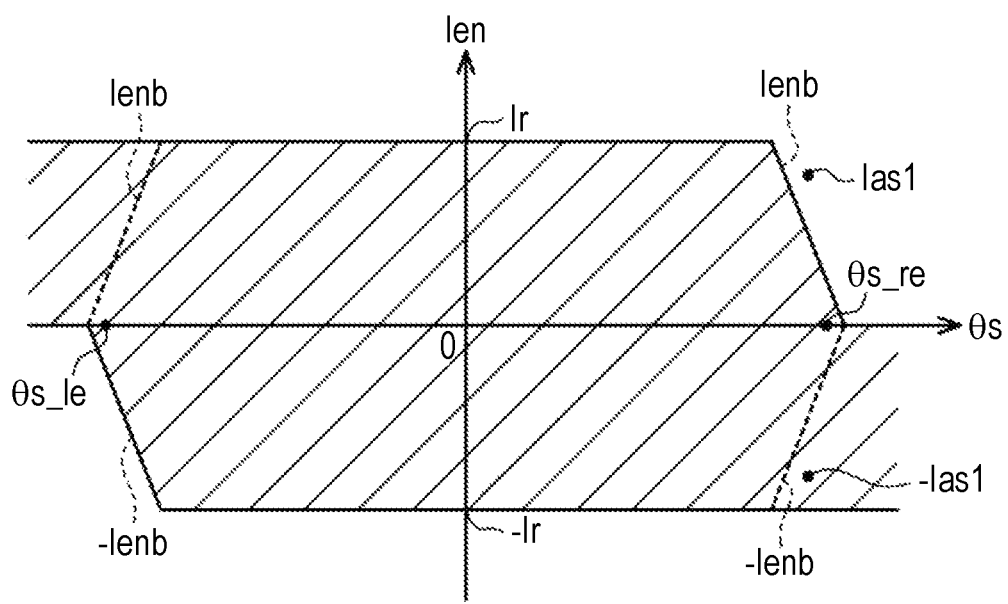
FIG. 5 is a graph illustrating a relationship between an absolute steering angle and a steering angle limit value.

Accordingly, as illustrated in FIG. 5, the steering angle limit value Ien is set in consideration of the steering direction relative to the absolute steering angle θs. In the drawing, the pre-adjustment steering angle limit value Ienb is illustrated as a dotted line. When the assist command value Ias* is plotted in the drawing, an area in which the absolute value of the steering angle limit value Ien is set to the rated current Ir is hatched.

For example, it is assumed that the end separation angle Δθ becomes equal to or less than the predetermined angle θ1 by performing steering to right and the absolute value of the assist command value Ias* becomes a predetermined value Ias1 which is greater than the pre-adjustment steering angle limit value Ienb by further performing turning steering. In this case, the absolute value of the steering angle limit value Ien is set to the pre-adjustment steering angle limit value Ienb less than the predetermined value Ias1, and the absolute value of the q-axis current command value Iq* is limited to the steering angle limit value Ien. Accordingly, an impact of end contact is relaxed.

It is assumed that the end separation angle Δθ becomes equal to or less than the predetermined angle θ1 by performing steering to right and the sign of the assist command value Ias* becomes negative and the absolute value thereof becomes "Ias1" greater than the pre-adjustment steering angle limit value Ienb by performing return steering thereafter. At this time, in this embodiment, when the end separation angle Δθ is equal to or less than the predetermined angle θ1 and return steering is not performed, the absolute value of the steering angle limit value Ien is the rated current Ir and thus the absolute value of the q-axis current command value Iq* is not limited to the predetermined value Ias1. Accordingly, a sufficient assist force is applied to the steering mechanism 5, and thus a catching feeling is less likely to be caused.

Determination of intention of turning which is performed by the offset steering angle calculating unit 82 will be described below. The offset steering angle calculating unit 82 determines that a driver tries to turn the vehicle at the time of execution of end contact relaxation control when the following conditions (a) to (e) for determination of intention of turning are satisfied continuously for a predetermined time. The predetermined time is set to an appropriate time in which a driver can be determined to perform turning steering or holding steering.

(a) The normal angle limiting component Iga is greater than a current threshold value Ith_st. (b) The absolute value of the steering torque Th is equal to or greater than a steering torque threshold value Tth. (c) The vehicle speed SPD is in a predetermined vehicle speed range.

(d) The absolute value of the motor angular velocity ωm is equal to or less than an angular velocity threshold value ωth. (e) The absolute value of the angular velocity change Δωm which is an amount of change of the motor angular velocity ωm is less than an angular velocity change threshold value Δωth.

The current threshold value Ith_st is set such that a predetermined assist force which is a minimum assist force capable of moving the rack shaft 12 to the rack end position is supplied from the motor 21 when the value of the angle limiting component Iga is the current threshold value Ith_st and the vehicle travels on a normal road surface at a low speed. In other words, the absolute value of the steering angle limit value Ien which is obtained by subtracting the current threshold value Ith_st from the rated current Ir is set to a magnitude at which a predetermined assist force is output from the motor 21 by supplying a current of the same absolute value to the motor 21. The current threshold value Ith_st is a current value based on the rated current Ir and is set to, for example, 50% of the rated current Ir.

The steering torque threshold value Tth is a steering torque which is required to hold steering of the steering wheel 3 when the vehicle is turned in a state in which the rack end 18 is in contact with the rack housing 13, and is set to an appropriate value which is greater than zero. The predetermined vehicle speed range indicates a vehicle speed range which is equal to or greater than a lower-limit vehicle speed Slo indicating that the vehicle is not stopped and which is less than an upper-limit vehicle speed Sup indicating that the vehicle is traveling at a low speed. The lower-limit vehicle speed Slo is set to a value which is slightly greater than zero and the upper-limit vehicle speed Sup is set to an appropriate value which is greater than the lower-limit vehicle speed Slo. The angular velocity threshold value ωth is an angular velocity indicating that the motor 21 is stopped and is set to a value which is slightly greater than zero. The angular velocity change threshold value Δωth is an angular velocity change indicating that the motor 21 does not substantially accelerate nor decelerate and is set to a value which is slightly greater than zero.

When the q-axis current command value Iq* calculated at the time of execution of partial release control is a value which is not affected by decreasing the correction value due to the execution of the partial release control, that is, a value which is not affected by increasing the steering angle limit value Ien, the offset steering angle calculating unit 82 stops calculation of the offset steering angle θoff and stops the partial release control. That is, the offset steering angle calculating unit 82 stops the partial release control in a steering situation in which the partial release control does not function actually.

Specifically, the offset steering angle calculating unit 82 stops the partial release control based on the result of comparison between the q-axis current command value Iq* and a stop determination value Ith_en based on the steering angle limit value Ien which is not increased due to execution of the partial release control. The offset steering angle calculating unit 82 calculates the stop determination value Ith_en by subtracting the angle limiting component Iga from the rated current Jr. The stop determination value Ith_en in this embodiment is the same as the steering angle limit value Ien which is not increased due to execution of the partial release control.

When steering to right, that is, steering in the positive direction, is performed, the offset steering angle calculating unit 82 compares the q-axis current command value Iq* with the stop determination value Ith_en with a positive sign (hereinafter referred to as a positive stop determination value Ith_en). When the q-axis current command value Iq* is less than the positive stop determination value Ith_en, that is, when the q-axis current command value Iq* is less than the steering angle limit value Ien which is not increased due to execution of the partial release control and the partial release control does not function actually, the offset steering angle calculating unit 82 stops the partial release control. On the other hand, when the q-axis current command value Iq* is equal to or greater than the positive stop determination value Ith_en, that is, when the q-axis current command value Iq* is equal to or greater than the steering angle limit value Ien which is not increased due to execution of the partial release control and the partial release control functions, the offset steering angle calculating unit 82 does not stop the partial release control.

When steering to left, that is, steering in the negative direction, is performed, the offset steering angle calculating unit 82 compares the q-axis current command value Iq* with the stop determination value Ith_en with a negative sign (hereinafter referred to as a negative stop determination value Ith_en). When the q-axis current command value Iq* is greater than the negative stop determination value Ith_en, the offset steering angle calculating unit 82 stops the partial release control. On the other hand, when the q-axis current command value Iq* is equal to or less than the negative stop determination value Ith_en, the offset steering angle calculating unit 82 does not stop the partial release control.

Figure 6:
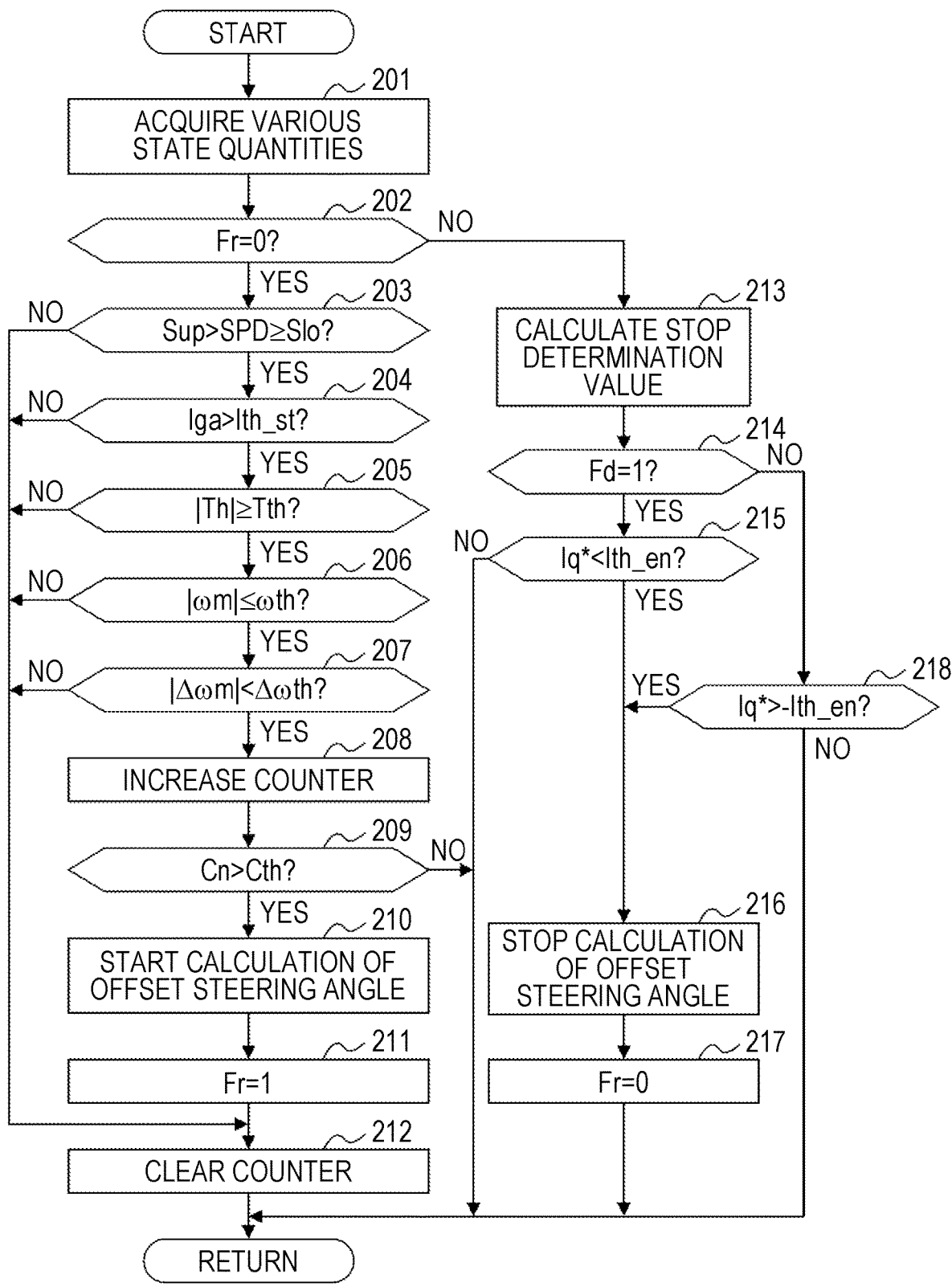
FIG. 6 is a flowchart illustrating a process routine of calculating an offset steering angle which is performed by an offset steering angle calculating unit.

A process flow of calculating the offset steering angle θoff which is performed by the offset steering angle calculating unit 82 will be described below. As illustrated in the flowchart of FIG. 6, when various state quantities are acquired (Step 201), the offset steering angle calculating unit 82 determines whether the execution flag Fr is "0," that is, whether partial release control is not performed (Step 202).

When the execution flag Fr is "0" (Step 202: YES), the offset steering angle calculating unit 82 determines whether the vehicle speed SPD is equal to or greater than the lower-limit vehicle speed Slo and less than the upper-limit vehicle speed Sup (Step 203). When the vehicle speed SPD is equal to or greater than the lower-limit vehicle speed Slo and less than the upper-limit vehicle speed Sup and is in a predetermined vehicle speed range (Step 203: YES), the offset steering angle calculating unit 82 determines whether the angle limiting component Iga is greater than the current threshold value Ith_st (Step 204). When the angle limiting component Iga is greater than the current threshold value Ith_st (Step 204: YES), the offset steering angle calculating unit 82 determines whether the absolute value of the steering torque Th is equal to or greater than the steering torque threshold value Tth (Step 205). When the absolute value of the steering torque Th is equal to or greater than the steering torque threshold value Tth (Step 205: YES), the offset steering angle calculating unit 82 determines whether the absolute value of the motor angular velocity ωm is equal to or less than the angular velocity threshold value ωth (Step 206). When the absolute value of the motor angular velocity ωm is equal to or less than the angular velocity threshold value ωth (Step 206: YES), the offset steering angle calculating unit 82 determines whether the angular velocity change Δωm is less than the angular velocity change threshold value Δωth (Step 207). When the angular velocity change Δωm is less than the angular velocity change threshold value Δωth (Step 207: YES), the offset steering angle calculating unit 82 causes the process flow to proceed to Step 208.

In Step 208, the offset steering angle calculating unit 82 increments a count value Cn of a counter indicating an elapsed time after determinations of Steps 203 to 207 have been performed, that is, after the conditions (a) to (e) have been satisfied. Subsequently, the offset steering angle calculating unit 82 determines whether the count value Cn is greater than a predetermined count value Cth corresponding to a predetermined time (Step 209). When the count value Cn is greater than the predetermined count value Cth (Step 209: YES), the offset steering angle calculating unit 82 starts calculation of the offset steering angle θoff (Step 210), sets the value of the execution flag Fr to "1" indicating that partial release control is being performed, and clears the count value Cn of the counter (Steps 211 and 212).

When the count value Cn is equal to or less than the predetermined count value Cth (Step 209: NO), the offset steering angle calculating unit 82 does not perform processes subsequent thereto. When any one of the determination results of Steps 203 to 207 is not positive (Steps 203 to 207: NO), the offset steering angle calculating unit 82 does not perform the processes of Steps 208 to 211, causes the process flow to proceed to Step 212, and clears the count value Cn.

On the other hand, when the value of the execution flag Fr is "1" (Step 202: NO), the offset steering angle calculating unit 82 calculates the stop determination value Ith_en (Step 213) and determines whether the steering angle position flag Fd is "1" (Step 214). When the steering angle position flag Fd is "1" (Step 214: YES), the offset steering angle calculating unit 82 determines whether the q-axis current command value Iq* is less than the positive stop determination value Ith_en (Step 215). When the q-axis current command value Iq* is less than the positive stop determination value Ith_en (Step 215: YES), the offset steering angle calculating unit 82 stops calculation of the offset steering angle θoff (Step 216) and sets the value of the execution flag Fr to "0" indicating that the partial release control is stopped (Step 217). On the other hand, when the steering angle position flag Fd is not "1" (Step 214: NO), the offset steering angle calculating unit 82 determines whether the q-axis current command value Iq* is greater than the negative stop determination value Ith_en (Step 218). When the q-axis current command value Iq* is greater than the negative stop determination value Ith_en (Step 218: YES), the offset steering angle calculating unit 82 causes the process routine to progress to Steps 216 and 217.

When the q-axis current command value Iq* is equal to or greater than the positive stop determination value Ith_en (Step 215: NO) or when the q-axis current command value Iq* is equal to or less than the negative stop determination value Ith_en (Step 218: NO), the offset steering angle calculating unit 82 does not perform the processes of Steps 216 and 217.

Operations and advantages of this embodiment will be described below. (1) When it is determined that a driver tries to turn the vehicle at the time of execution of end contact relaxation control, the current command value calculating unit 51 performs partial release control for decreasing the correction value of the q-axis current command value Iq* in the end contact relaxation control based on the steering torque Th. Accordingly, limitation of the q-axis current command value Iq* due to execution of the end contact relaxation control is partially released and the q-axis current command value Iq* increases. Accordingly, for example, even when movement of the rack shaft 12 is limited at the virtual rack end position due to execution of the end contact relaxation control, the partial release control is performed to decrease the correction value of the q-axis current command value Iq* by allowing the driver to turn the vehicle, and thus it is possible to move the rack shaft 12 to the actual rack end position. As a result, it is possible to curb deterioration in small-turn performance of the vehicle.

In this embodiment, when the q-axis current command value Iq* calculated at the time of execution of the partial release control is a value which is not affected by decreasing the correction value based on execution of the partial release control, the current command value calculating unit 51 stops the partial release control. Accordingly, it is possible to curb sudden change of the q-axis current command value Iq* with stopping of the partial release control and to curb deterioration in a steering feeling.

(2) When the end separation angle Δθ is equal to or less than the predetermined angle θ1, the current command value calculating unit 51 calculates the q-axis current command value Iq* such that an increase of the end separation angle Δθ is not limited by execution of the end contact relaxation control. Specifically, when the end separation angle Δθ is equal to or less than the predetermined angle θ1 and return steering in which the end separation angle Δθ is increased is performed, the current command value calculating unit 51 sets the absolute value of the steering angle limit value Ien to the rated current Ir. Accordingly, the assist force which is applied to the steering mechanism 5 is less likely to be insufficient, for example, when return steering from the vicinity of a rack end position is performed. As a result, a catching feeling is less likely to be caused and it is possible to curb deterioration in a steering feeling.

(3) The current command value calculating unit 51 compares the q-axis current command value Iq* calculated at the time of execution of the partial release control with the stop determination value Ith_en based on the steering angle limit value Ien which is not increased by execution of the partial release control. Accordingly, it is possible to appropriately determine whether the q-axis current command value Iq* calculated at the time of execution of the partial release control is a value which is not affected by decreasing the correction value based on execution of the partial release control.

(4) When the turning wheels 4 are turned to right and the end separation angle Δθ is equal to or less than the predetermined angle θ1 and when the q-axis current command value Iq* calculated at the time of execution of the partial release control is less than the positive stop determination value Ith_en, the current command value calculating unit 51 stops the partial release control. When the turning wheels 4 are turned to left and the end separation angle Δθ is equal to or less than the predetermined angle θ1 and when the q-axis current command value Iq* calculated at the time of execution of the partial release control is greater than the negative stop determination value Ith_en, the current command value calculating unit 51 stops the partial release control. Accordingly, for example, even when the sign of the q-axis current command value Iq* is inverted by return steering, it is possible to appropriately determine whether the q-axis current command value Iq* calculated at the time of execution of the partial release control is a value which is not affected by decreasing the correction value based on execution of the partial release control.

(5) The current command value calculating unit 51 includes a steering angle limit value calculating unit 71 that calculates the steering angle limit value Ien which decreases with the decrease of the end separation angle Δθ when the end separation angle Δθ is equal to or less than the predetermined angle θ1. The current command value calculating unit 51 performs the end contact relaxation control by limiting the absolute value of the q-axis current command value Iq* to the steering angle limit value Ien. Accordingly, as the steering angle limit value Ien increases, the correction value of the q-axis current command value Iq* due to execution of the end contact relaxation control decreases. The steering angle limit value calculating unit 71 includes the angle limiting component calculating unit 84 that calculates the normal angle limiting component Iga and the release angle limiting component Iga', and calculates a value obtained by subtracting the normal angle limiting component Iga or the release angle limiting component Iga' from the rated current Ir as the pre-adjustment steering angle limit value Ienb. Accordingly, by setting the release angle limiting component Iga' to be less than the normal angle limiting component Iga, it is possible to easily perform the partial release control for decreasing the correction value of the q-axis current command value Iq*.

The aforementioned embodiment can be modified as follows. The aforementioned embodiment and the following modified examples can be combined unless technical confliction arises. In the aforementioned embodiment, the determination conditions for stopping the partial release control are changed depending on the steering direction. However, the disclosure is not limited thereto and a condition in which the q-axis current command value Iq* is less than the absolute value of the steering angle limit value Ien which is not increased due to execution of the partial release control may be used as the determination conditions for stopping the partial release control and the determination conditions may be constant regardless of the steering direction.

In the aforementioned embodiment, the steering angle limit value Ien which is not increased due to execution of the partial release control is used as the stop determination value Ith_en. However, the disclosure is not limited thereto and another value may be used as the stop determination value Ith_en as long as it can be used to determine whether the q-axis current command value Iq* calculated at the time of execution of the partial release control is a value which is not affected by decreasing the correction value based on execution of the partial release control.

In the aforementioned embodiment, when steering to right is performed and the assist command value Ias* is less than the positive pre-adjustment steering angle limit value Ienb, the absolute value of the steering angle limit value Ien is set to the rated current Ir, but the disclosure is not limited thereto and the absolute value of the steering angle limit value Ien may be set to a value less than the rated current Ir as long as the increase of the end separation angle $\Delta\theta$ is not limited. Similarly, when steering to left is performed and the assist command value Ias* is equal to or greater than the negative pre-adjustment steering angle limit value Ienb, the absolute value of the steering angle limit value Ien may be set to a value less than the rated current Ir.

In the aforementioned embodiment, the steering angle limit value adjusting unit 87 may not be provided and the value obtained by subtracting the normal angle limiting component Iga and the release angle limiting component Iga' from the rated current Ir may be used as the steering angle limit value Ien without any change.

In the aforementioned embodiment, the release end separation angle $\Delta\theta'$ is calculated by adding the offset steering angle $\theta$off to the end separation angle $\Delta\theta$. However, the disclosure is not limited thereto and, for example, a release absolute steering angle $\theta$s' may be calculated by subtracting the offset steering angle $\theta$off from the absolute steering angle s and a value indicating a distance of the absolute steering angle $\theta$s' from the end-position-corresponding angles $\theta$s_re and $\theta$s_le may be calculated as the release end separation angle $\Delta\theta'$.

In the above embodiment, for example, a configuration in which the angle limiting component calculating unit 84 includes a normal map and a release map in which the horizontal axis of the normal map is offset depending on the offset steering angle $\theta$off and the release end separation angle $\Delta\theta'$ is not input to the angle limiting component calculating unit 84 may be employed. With this configuration, since the horizontal axis in the release map is offset depending on the offset steering angle $\theta$off, the release angle limiting component Iga' which is less than the normal angle limiting component Iga can also be calculated similarly to the embodiment.

In the aforementioned embodiment, the release angle limiting component Iga' may be adjusted such that the angle limiting component Iga' is not equal to or greater than a preset limiting threshold value at the time of execution of the partial release control. The limiting threshold value is, for example, a value with which the predetermined assist force is output from the motor 21 by supplying a current of the same limiting threshold value to the motor 21 and is set to the same value as the current threshold value Ith_st. Accordingly, even when end contact in which the rack shaft 12 comes into contact with the rack housing 13 is generated due to execution of the partial release control, it is possible to curb an increase in an impact thereof.

In the aforementioned embodiment, the target steering velocity $\omega$s* is calculated using Expression (2) in a state in which the elasticity coefficient K and the inertia coefficient J are set to zero, but the disclosure is not limited thereto and, for example, at least one of the elasticity coefficient K and the inertia coefficient J may not be set to zero. In this case, the target steering velocity $\omega$s* can be calculated, for example, using an actual absolute steering angle $\theta$s and a steering angular velocity in addition to the steering torque Th. Instead of using the model formula, for example, a map indicating a relationship between the steering torque Th and the offset steering angle $\theta$off may be set and the offset steering angle $\theta$off corresponding to the steering torque may be calculated with reference to the map.

In the aforementioned embodiment, the partial release control is performed by calculating the offset steering angle $\theta$off based on the steering torque Th and calculating the release angle limiting component Iga' less than the normal angle limiting component Iga based on the offset steering angle $\theta$off. However, the disclosure is not limited thereto and the partial release control may be performed, for example, by calculating the release angle limiting component Iga' which decreases with the lapse of time from starting of the partial release control. In this case, it is possible to calculate the target steering velocity $\omega$s*, for example, based on an amount of change of the release angle limiting component Iga'.

In the aforementioned embodiment, when the conditions (a) to (e) are satisfied continuously for a predetermined time, it is determined that a driver tries to turn the vehicle at the time of execution of end contact relaxation control and partial release control is performed, but the disclosure is not limited thereto and the conditions for starting partial release control can be appropriately changed. For example, when the conditions (a) to (e) are satisfied, it may be determined that a driver tries to turn the vehicle regardless of whether the conditions are satisfied continuously for the predetermined time. For example, it may not be determined whether one of the conditions (d) and (e) is satisfied and it may be determined whether a yaw rate of the vehicle is equal to or greater than a yaw rate threshold value indicating a turning state instead of the condition (c). In addition, in the conditions (d) and (e), the steering velocity $\omega$s may be used instead of the motor angular velocity $\omega$m.

In the aforementioned embodiment, when it is determined that a driver tries to turn the vehicle at the time of execution of end contact relaxation control, a great steering angle limit value Ien is calculated and the correction value of the q-axis current command value Iq* is decreased by subtracting the release angle limiting component Iga' which is less than the normal angle limiting component Iga from the rated current Ir. However, the disclosure is not limited thereto and, for example, the correction value of the q-axis current command value Iq* may be decreased by directly correcting the value of the steering angle limit value Ien such that the steering angle limit value Ien increases at the time of execution of partial release control, and the way of performing partial release control can be appropriately modified.

In the aforementioned embodiment, by monitoring the rotation of the motor 21 even when the ignition switch is turned off, the rotation speed of the motor 21 from the origin is normally integrated, and the absolute motor angle and the absolute steering angle $\theta$s are calculated. However, the disclosure is not limited thereto and, for example, a steering sensor that detects a steering angle as an absolute angle may be provided, the rotation speed of the motor 21 from the origin may be integrated based on the steering angle detected by the steering sensor and the reduction gear ratio of the reduction gear mechanism 22, and the absolute motor angle and the absolute steering angle $\theta$s may be calculated.

In the aforementioned embodiment, end contact relaxation control is performed by limiting the assist command value Ias* to the steering angle limit value Ien, but the disclosure is not limited thereto and end contact relaxation control may be performed, for example, by adding a steering reaction component which increases toward the rack end position, that is, a component with a sign opposite to the sign of the assist command value Ias*, to the assist command value Ias*. With this configuration, when it is determined that a driver tries to turn the vehicle at the time of execution of end contact relaxation control, the correction value of the q-axis current command value Iq* can be decreased by decreasing the steering reaction component depending on the steering torque Th.

In the aforementioned embodiment, a guard process of limiting the absolute value of the assist command value Ias* to equal to or less than the limit value Ig is performed on the assist command value Ias*, but the disclosure is not limited thereto and, for example, the guard process may be performed on a value obtained by correcting the assist command value Ias* using a compensation value based on a torque differential value obtained by differentiating the steering torque Th.

In the aforementioned embodiment, the limit value setting unit 62 includes the voltage limit value calculating unit 72 that calculates the voltage limit value Ivb based on the source voltage Vb, but the disclosure is not limited thereto and another calculation unit that calculates another limit value based on another state quantity may be provided in addition to or instead of the voltage limit value calculating unit 72. A configuration in which the limit value setting unit 62 does not include the voltage limit value calculating unit 72 and sets the steering angle limit value Ien as the limit value Ig without any change may be employed.

In the aforementioned embodiment, a value obtained by subtracting the normal angle limiting component Iga or the release angle limiting component Iga' from the rated current Ir is used as the steering angle limit value Ien, but the disclosure is not limited thereto and a value obtained by subtracting the angle limiting component Iga or the angle limiting component Iga' and an amount of current limitation which is determined by the motor angular velocity from the rated current Ir may be used as the steering angle limit value Ien.

In the aforementioned embodiment, the steering control device 1 controls the EPS 2 of a type in which the EPS actuator 6 applies a motor torque to the column shaft 15, but the disclosure is not limited thereto and, for example, the steering control device 1 may control a steering system of a type in which a motor torque is applied to the rack shaft 12 via a ball screw nut. Not limited to the EPS, the steering control device 1 may control a steer-by-wire type steering device in which transmission of power between a steering unit which is operated by a driver and a turning unit that turns the turning wheels is cut off and end contact relaxation control may be performed on a torque command value or a q-axis current command value of a motor of a turning actuator which is provided in the turning unit in the same way as in this embodiment.

What is claimed is:

1. A steering control device for a steering system including a housing, a turning shaft that is accommodated in the housing such that the turning shaft is able to reciprocate, and an actuator that applies a motor torque for causing the turning shaft to reciprocate using a motor as a drive source, the steering control device comprising:
    an absolute steering angle detecting unit configured to detect an absolute steering angle which is a rotation angle of a rotation shaft which is able to be converted into a turning angle of turning wheels connected to the turning shaft and which is expressed as an absolute angle including a range exceeding 360°; and
    a current command value calculating unit configured to calculate a current command value corresponding to a target value of the motor torque output from the motor, wherein
    the steering control device is configured to control activation of the motor such that an actual current value which is supplied to the motor reaches the current command value,
    the current command value calculating unit is configured to store an end-position-corresponding angle which is an angle indicating an end position at which movement of the turning shaft is limited due to end contact in which the turning shaft comes into contact with the housing and which is correlated with the absolute steering angle,
    the current command value calculating unit is configured to perform end contact relaxation control for correcting the current command value such that a decrease of an end separation angle indicating a distance of the absolute steering angle from the end-position-corresponding angle is limited when the end separation angle is equal to or less than a predetermined angle,
    the current command value calculating unit is configured to perform partial release control for decreasing a correction value of the current command value due to execution of the end contact relaxation control when a vehicle is tried to be turned at the time of execution of the end contact relaxation control, and
    the current command value calculating unit is configured to stop the partial release control when the current command value which is calculated at the time of execution of the partial release control is a value which is not affected by decreasing the correction value based on execution of the partial release control.

2. The steering control device according to claim 1, wherein the current command value calculating unit is configured to calculate the current command value such that an increase of the end separation angle is not limited through the end contact relaxation control when the end separation angle is equal to or less than the predetermined angle.

3. The steering control device according to claim 1, wherein:
    the current command value calculating unit is configured to calculate a steering angle limit value which decreases with a decrease of the end separation angle when the end separation angle is equal to or less than the predetermined angle;
    the current command value calculating unit is configured to perform the end contact relaxation control by limiting an absolute value of the current command value to the steering angle limit value;
    the current command value calculating unit is configured to perform the partial release control by increasing the steering angle limit value; and
    the current command value calculating unit is configured to stop the partial release control based on a result of comparison between the current command value which is calculated at the time of execution of the partial release control and a stop determination value based on the steering angle limit value which is not increased due to execution of the partial release control.

4. The steering control device according to claim 3, wherein, when a sign of the current command value for causing the motor to generate the motor torque for turning the turning wheels in one of rightward and leftward directions is defined as being positive and the sign of the current command value for causing the motor to generate the motor torque for turning the turning wheels in the other direction is defined as being negative, the current command value calculating unit is configured to stop the partial release control when the end separation angle is equal to or less than the predetermined angle by turning the turning wheels in the one direction and the current command value calculated at the time of execution of the partial release control is less than the stop determination value which is positive, and to stop the partial release control when the end separation angle is equal to or less than the predetermined angle by turning the turning wheels in the other direction and the current command value calculated at the time of execution of the partial release control is greater than the stop determination value which is negative.

5. The steering control device according to claim 3, wherein:
   the current command value calculating unit is configured to calculate an angle limiting component which decreases as the end separation angle increases;
   the current command value calculating unit is configured to calculate the steering angle limit value based on a value obtained by subtracting the angle limiting component from a rated current of the motor; and
   the current command value calculating unit is configured to calculate the angle limiting component such that the angle limiting component is less at the time of execution of the partial release control than at the time of non-execution of the partial release control.

* * * * *